(12) United States Patent
Jordan

(10) Patent No.: US 8,140,492 B2
(45) Date of Patent: Mar. 20, 2012

(54) METHOD AND APPARATUS FOR TRANSPOSING DATA TREES

(75) Inventor: Myles Jordan, Melbourne (AU)

(73) Assignee: Computer Associates Think, Inc., Islandia, NY (US)

( * ) Notice: Subject to any disclaimer, the term of this patent is extended or adjusted under 35 U.S.C. 154(b) by 573 days.

(21) Appl. No.: 11/238,876

(22) Filed: Sep. 29, 2005

(65) Prior Publication Data

US 2007/0073752 A1    Mar. 29, 2007

(51) Int. Cl.
*G06F 7/00* (2006.01)
(52) U.S. Cl. ........................................................ 707/695
(58) Field of Classification Search .................. 707/100, 707/695
See application file for complete search history.

(56) References Cited

U.S. PATENT DOCUMENTS

| | | | | |
|---|---|---|---|---|
| 6,622,150 | B1 * | 9/2003 | Kouznetsov et al. | 707/200 |
| 6,836,890 | B1 * | 12/2004 | Waldorf et al. | 719/313 |
| 2004/0068498 | A1 * | 4/2004 | Patchet et al. | 707/6 |
| 2004/0172300 | A1 * | 9/2004 | Mihai et al. | 705/2 |

OTHER PUBLICATIONS

Bielikova et al., "Space-Efficient Techniques for Storing Versions of Software Components," XP-002408840, Slovak Technical University, Dept. of Computer Sciences and Engineering, 6 pates, 1996.
Chawathe et al., "Change Detection in Hierarchically Structured Information*," XP-002169387, Department of Computer Science, Stanford University, pp. 1-31, Jun. 4, 1996.
Agrawal et al., "Upgrading Distributed Applications with the Version Manager," XP-002408843, School of Computer Science, Carnegie Mellon University, title page plus pp. 1-17, Mar. 2005.
Dolstra, "Efficient Upgrading in a Purely Functional Component Deployment Model," XP- 002408842, Utrecht University, 16 pages, May 2005.
Potter, "Using Binary Delta Compression (BDC) Technology to Update Windows XP and Windows Server 2003," XP-002408841, Windows Server System, Microsoft Windows Server 2003, Title, Copyright, and Contents pages, plus pp. 5-15, Jun. 2005.
Hayase et al., "Revising Control System Using Delta Script of Syntax Tree," XP-002408839, pp. 133-149,,Sep. 5, 2005.
Notification of Transmittal of the International Search Report and the Written Opinion, PCT, International application No. PCT/US2006/ 037604, 12 pages, Dec. 13, 2006.

* cited by examiner

*Primary Examiner* — Apu Mofiz
*Assistant Examiner* — Ajith Jacob
(74) *Attorney, Agent, or Firm* — Baker Botts L.L.P.

(57) ABSTRACT

According to one embodiment, a method for transposing data trees includes translating a first data tree and a second data tree into a first format. A label within the second data tree is replaced with a label within the first data tree if the data in the first data tree matches the data in the second data tree and such a label is provided in the first data tree. The replaced label is stored in a third data tree, and the third data tree is translated into a second format.

23 Claims, 8 Drawing Sheets

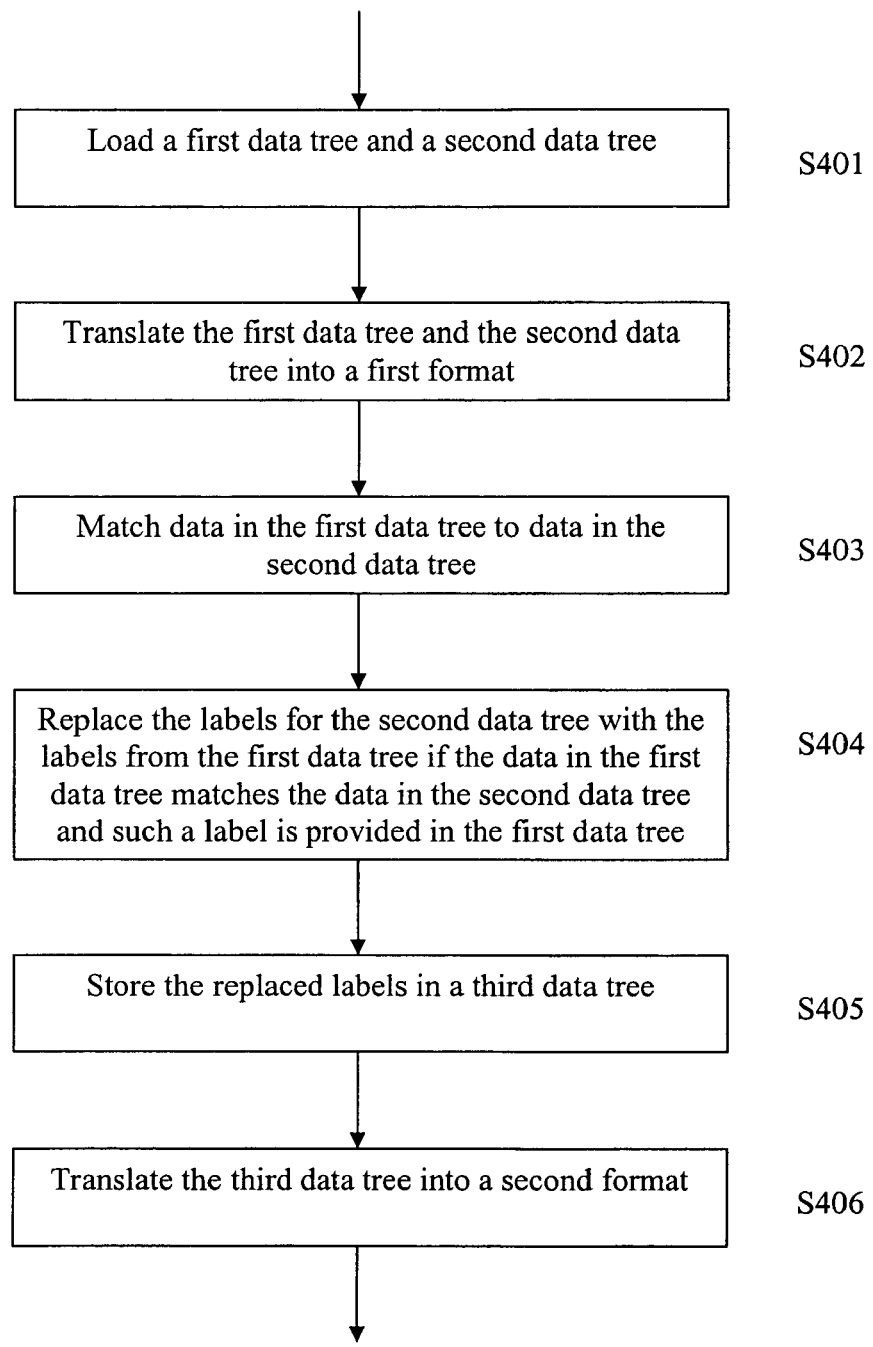

METHOD AND APPARATUS FOR TRANSPOSING DATA TREES

TECHNICAL FIELD

The present disclosure relates generally to data trees and, more particularly, to a method and apparatus for transposing data trees.

BACKGROUND OF THE INVENTION

With the growth of the Internet, the increased use of computers and the exchange of information between individual users poses a threat to the security of computers. Among the various security threats that present increasingly difficult challenges to the secure operation of computer systems are malicious attacks, such as computer viruses, worms, Trojan horses, etc. To protect themselves from malicious attacks, computer systems may utilize anti-virus programs. One approach involves using anti-virus programs, such as virus scanning programs, to protect against the spread of viruses. Virus scanning programs may detect the virus and then isolate and remove the viral code. For example, the virus scanning program may contain a list of previously defined virus signatures, containing the binary patterns of a virus, each associated with a virus and scan the various files of a system looking for a match to a particular virus signature. If a virus is detected, the user may be notified and further steps may be taken to rid the system of the malicious code.

However, the virus scanning software must be continuously updated in order to be effective in detecting new and modified malicious attacks. Many security software providers offer services that update virus signatures daily, for example, in order to adequately respond to new virus threats. Such updates, even where including minimal changes to the virus signatures, may require a great deal of bandwidth due to complex representational differences between the old and new signature files.

SUMMARY OF THE INVENTION

According to one embodiment, a method for transposing data trees includes translating a first data tree and a second data tree into a first format. A label within the second data tree is replaced with a label within the first data tree if the data in the first data tree matches the data in the second data tree and such a label is provided in the first data tree. The replaced label is stored in a third data tree, and the third data tree is translated into a second format.

According to another embodiment, a system for transposing data trees includes a memory operable to store relational data and a processor coupled to the memory. The processor translates a first data tree and a second data tree into a first format and matches data in the first data tree to data in the second data tree. A label within the second data tree is replaced with a label within the first data tree if the data in the first data tree matches the data in the second data tree and such a label is provided in the first data tree. The replaced label is stored in a third data tree, and the third data tree is translated into a second format.

According to still another embodiment, logic for transposing data trees is encoded in media and operable when executed to translate a first data tree and a second data tree into a first format. The logic matches data in the first data tree to data in the second data tree. A label within the second data tree is replaced with a label within the first data tree if the data in the first data tree matches the data in the second data tree and such a label is provided in the first data tree. The logic stores the replaced label in a third data tree and translates the third data tree into a second format.

Embodiments of the invention provide various technical advantages. One advantage may be that relational data stored in data trees may be reliably and efficiently related to one another. Another advantage may be that data trees may be transposed using a binary delta algorithm. Specifically, representational differences between updated data files may be reduced. As a result, the bandwidth required for a binary delta file may be reduced such that programs, such as virus scanning software, that are frequently updated are more efficiently executed.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

In accordance with the present invention, techniques for transposing data trees are provided. According to particular embodiments, these techniques provide reliable and efficient ways to transpose data trees using a binary delta algorithm.

FIG. 4B shows a flow chart illustrating a method for transposing data trees, according to an embodiment of the present disclosure;

DETAILED DESCRIPTION OF THE INVENTION

The present disclosure provides tools (in the form of methodologies, apparatuses, and systems) for transposing data trees. The tools may be embodied in one or more computer programs stored on a computer readable medium or program storage device and/or transmitted via a computer network or other transmission medium.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
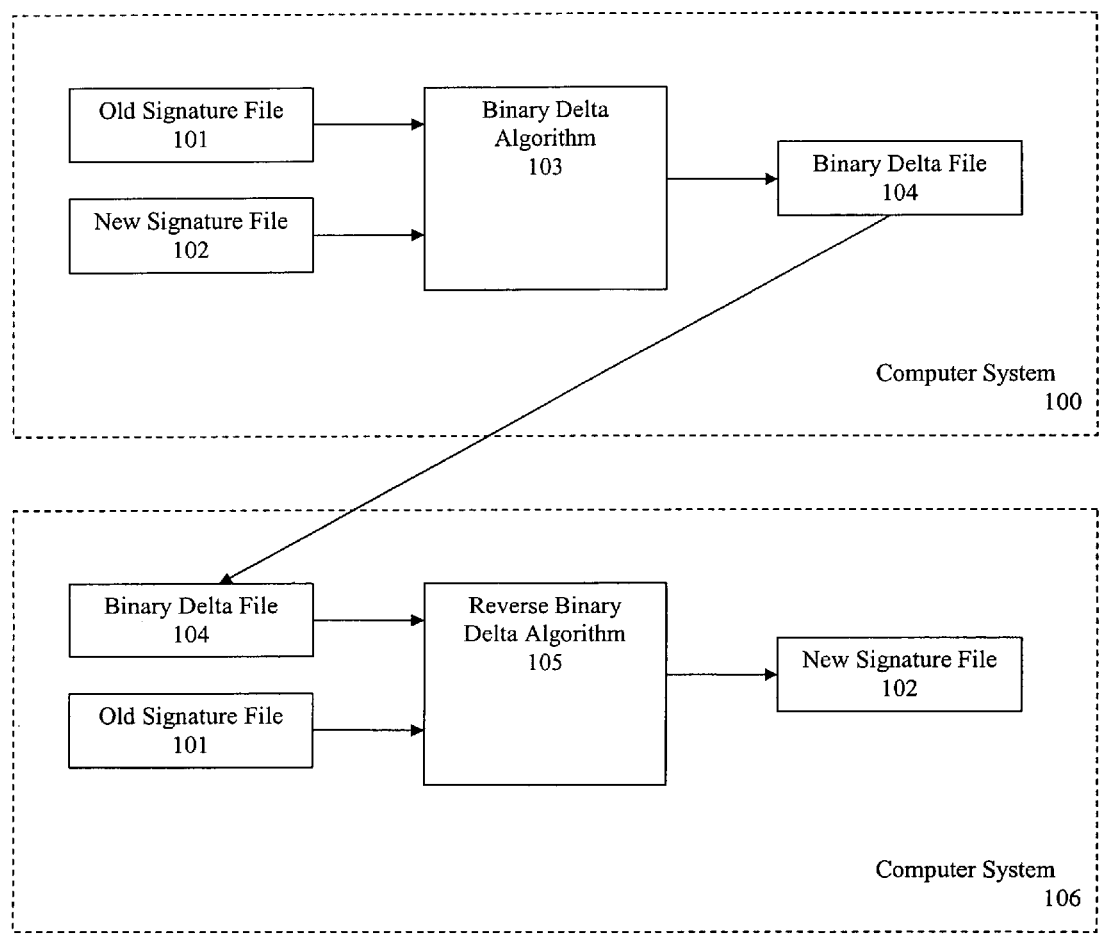
FIG. 1 shows a block diagram illustrating the binary delta algorithm.

FIG. 1 is a block diagram illustrating the binary delta algorithm. In a first computer system 100, an old signature file 101 and a new signature file 102 are provided. The binary delta algorithm 103 determines the differences between the old signature file 101 and the new signature file 102 and creates a binary delta file 104 as output. If the old signature file 101 and the new signature file 102 are very similar, then the size of the binary delta file 104 will be very small. At a second computer system 106, the reverse binary delta algorithm 105 takes the binary delta file 104 and the old signature file 101 as input and creates the new signature file 102 as output.

The binary delta algorithm 103 works by comparing the old signature file 101 with the new signature file 102 and finding the series of bytes shared by both of the files. Bytes that already exist in the old signature file are not distributed with the new signature file. Therefore, the more common the byte strings are between the old signature file 101 and the new signature file 102, the smaller the binary delta file 104 is. For example, if both the old signature file 101 and the new signature file 102 consist entirely of a list of numbers, with the only difference being a few entries at the end of the list, then the binary delta file 104 will be very small as it only needs to encode a few entries. However, if the old signature file 101 and the new signature file 102 share few similarities, then the binary delta file 104 may be relatively large.

Figure 2:
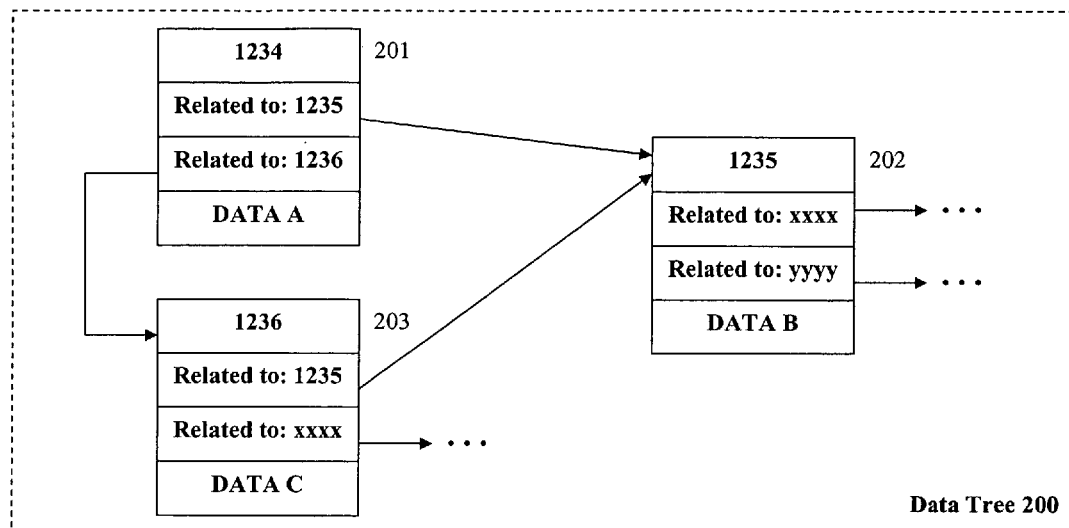
FIG. 2 shows a block diagram illustrating an exemplary relational binary tree.
Figure 2:
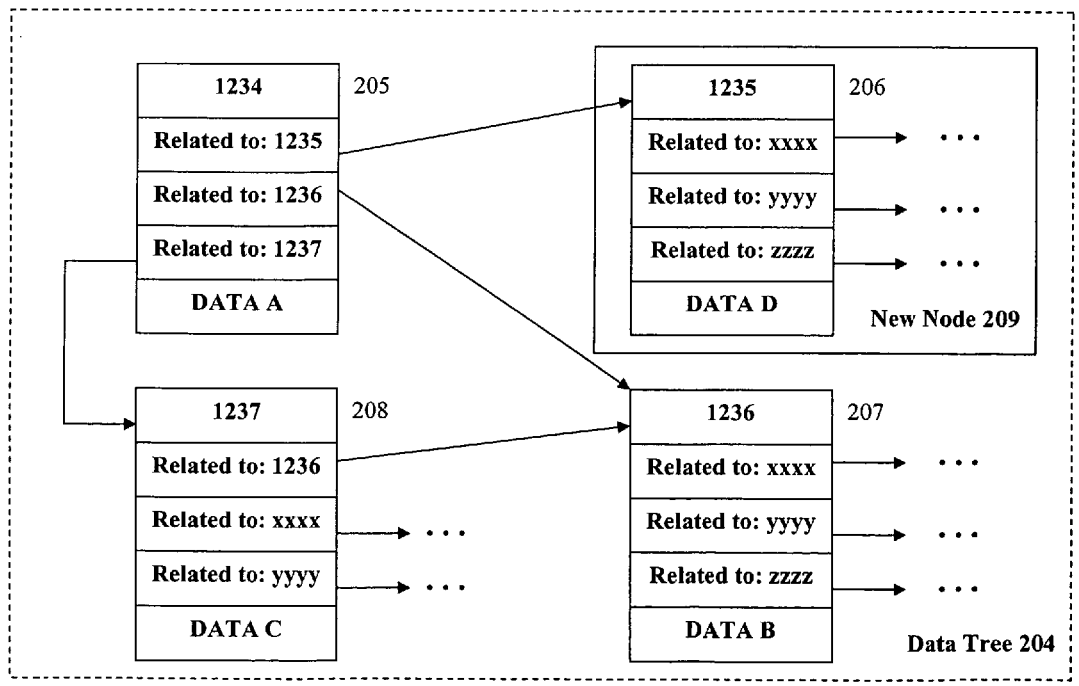

A binary delta algorithm, however, is not typically very effective with respect to large scale changes. For example, signature files may contain relational data stored as trees, such as relational binary trees, where a small change in meaning can result in a significant change in representation. This can lead to unusually large update files being released. FIG. 2 is a block diagram illustrating an exemplary relational binary tree. The relational aspect of the data is implemented by labeling each node in the tree with a unique identifier 205, which can then be used as a destination vector for a relational link from other nodes. For example, in data tree 200, node 1234 201 is related to node 1235 202 and Node 1236 203 and node 1236 203 is related to node 1235 202. However, data tree 204 illustrates a tree constructed using a node labeling scheme that does not maintain labels that have been used in the prior version of the tree, for example, data tree 200. When new node 209 is added to data tree 204, the representation of the relationships (for example, node labels) can change dramatically. New node 209 has assumed the label 1235 and node 1235 202 is now node 1236 207. Thus, a relatively small change, such as the adding of a single node, has created a relatively large change in the representation of data. If the binary delta algorithm is utilized to encode the differences between the two data trees, the binary delta file would be significantly large, resulting in an increased bandwidth cost.

Figure 3:
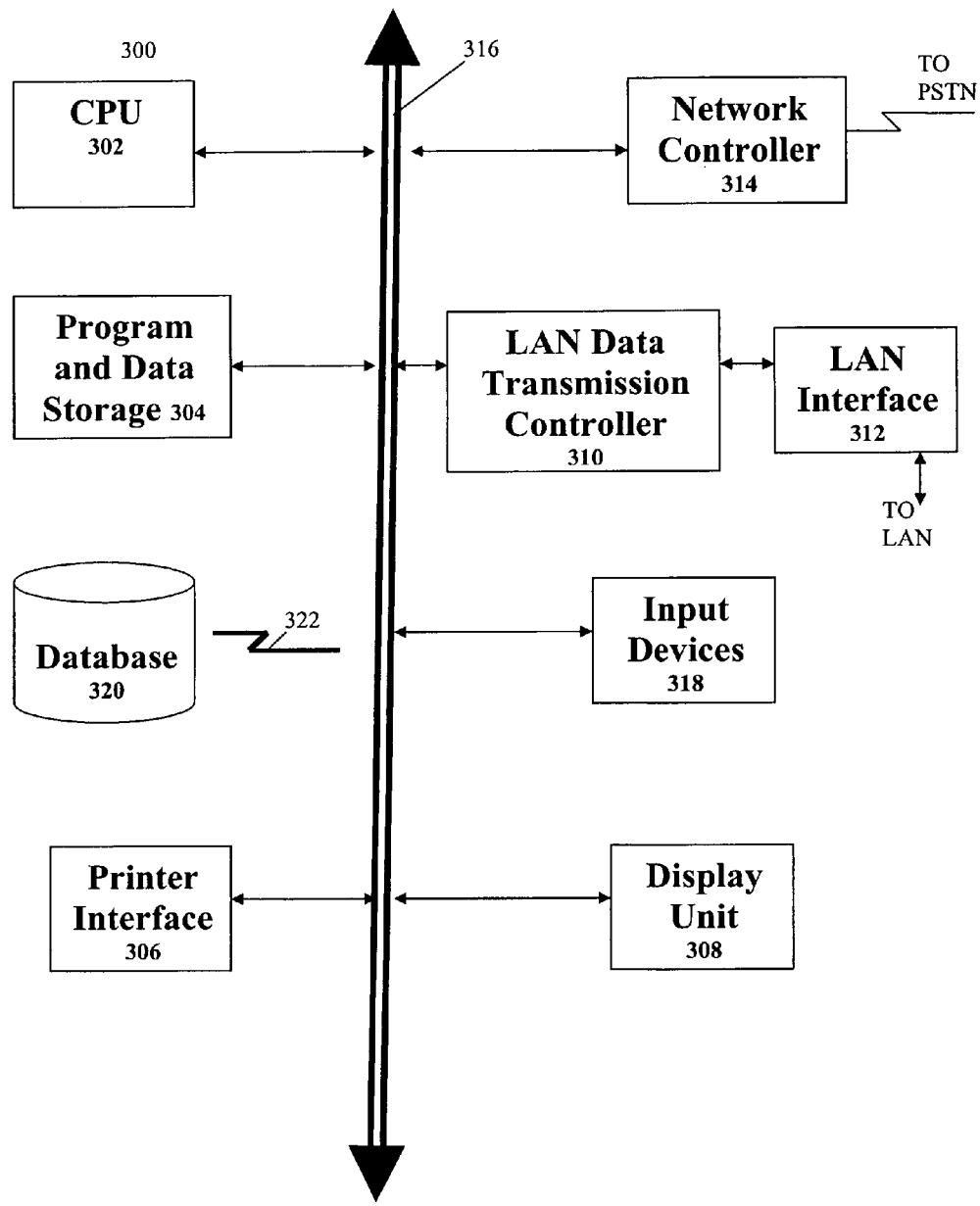
FIG. 3 shows a block diagram of an exemplary computer system capable of implementing the method and system of the present disclosure.

Accordingly, it would be beneficial to provide a reliable, fast and efficient way to transpose data trees while using the binary delta algorithm. FIG. 3 shows an example of a computer system 300 which may implement the method and system of the present disclosure. In particular embodiments, the method and system may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

In the illustrated embodiment, computer system 300 includes a central processing unit (CPU) 302, program and data storage devices 304, a printer interface 306, a display unit 308, a (LAN) local area network data transmission controller 310, a LAN interface 312, a network controller 314, an internal bus 316, and one or more input devices 318 (for example, a keyboard, mouse etc.). As shown, system 300 may be connected to a database 320, via a link 322. It is generally recognized, however, that computer system 300 is merely one example system for transposing data in data trees. The specific embodiments described herein are illustrative, computer system(s) as referred to herein may include(s) individual computers, servers, computing resources, networks, etc., and many variations can be introduced on these embodiments without departing from the spirit of the disclosure or from the scope of the appended claims. Furthermore, computer system 300 may include fewer or more components than those illustrated.

Figure 4A:
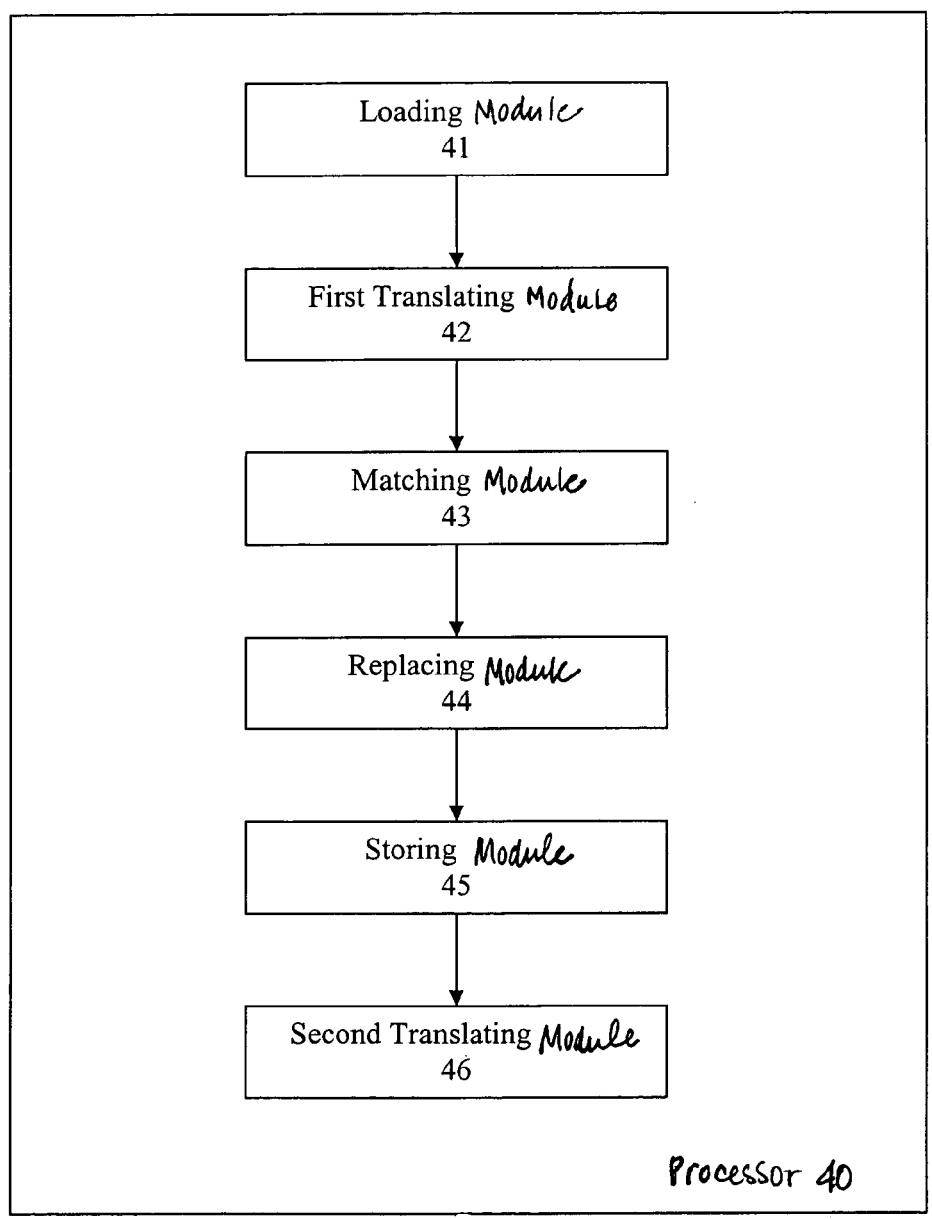
FIG. 4A shows a block diagram illustrating an apparatus for transposing data trees, according to an embodiment of the present disclosure.

A processor for transposing data trees, according to one embodiment of the disclosure, will be discussed with reference to FIG. 4A. The processor 40 includes a loading module 41, a first translating module 42, a matching module 43, a replacing module 44, a storing module 45, and a second translating module 46. It should be apparent that, in particular embodiments, the above described modules may be respective portions of, or routines in, a computer program which transposes data trees (and perhaps performs other functions). In particular embodiments, processor 40 may be incorporated into system 300 and may operate in a manner similar to CPU 302 described above with regard to FIG. 3.

A method for transposing data trees, will be explained below with reference to FIGS. 4A and 4B. The loading module 41 loads a first data tree and a second data tree (Step S401). The first translating module 42 translates the first data tree and the second data tree into a first format (Step S402). The matching module 43 matches data in the first data tree to data in the second data tree (Step S403). The replacing module 44 replaces a label within the second data tree with a label from the first data tree if the data in the first data tree matches the data in the second data tree and such a label is provided in the first data tree (Step S404). The storing module 45 stores the replaced labels in a third data tree (Step S405). The translating module 46 translates the third data tree into a second format (Step S406).

The described processor and method, however, are provided as just one example of a system and method for transposing data trees using a binary delta algorithm. Modifications, additions, or omissions may be made to the processor of FIG. 4A and the method of FIG. 4B without departing from the scope of the invention. For example, the components of processor 40 may be integrated or separated according to particular needs. Moreover, the operations of processor 40 may be performed by more, fewer, or other modules. For example, storing module 45 may be omitted, in particular embodiments, and the replaced labels within the third data tree may be stored in a database external to processor 40, such as database 320 of system 300 (Step S405). As another example, the operations performed by first translating module 42 and second translating module 46 may be performed by a single module that is internal or external to processor 40.

Figure 5:
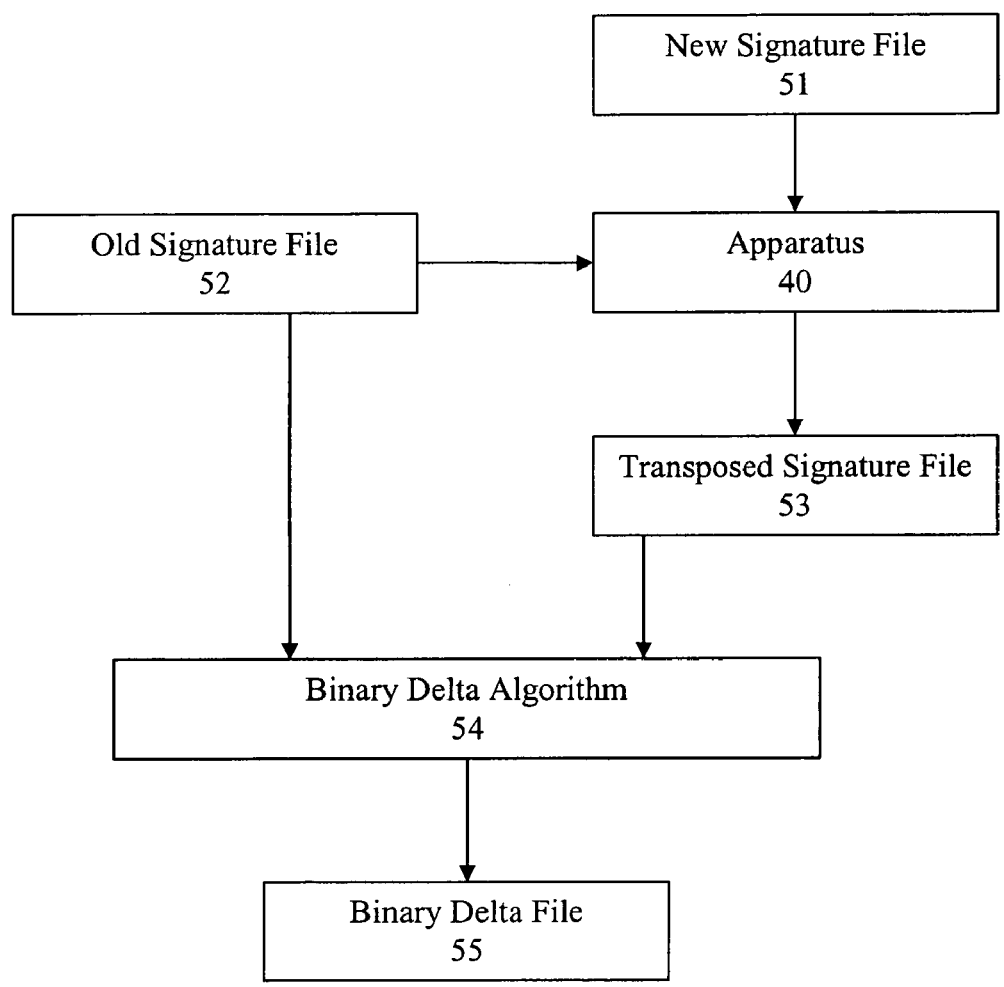
FIG. 5 is a block diagram illustrating how the apparatus for transposing data trees operates in connection with the binary delta algorithm, according to an embodiment of the present disclosure.

According to an embodiment of the present disclosure, sections of a newly created signature file may be transposed so that the binary delta created between the new signature file and an old signature file is as small as possible. FIG. 5 is a block diagram illustrating how the apparatus for transposing data trees operates in connection with the binary delta algorithm, according to an embodiment of the present disclosure. New signature file 51 and old signature file 52 are provided as input to apparatus 40, according to an embodiment of the present disclosure. A transposed signature file 53 is output by apparatus 40. The transposed signature file 53 and the old signature file 52 are then used by the binary delta algorithm 54 to produce a binary delta file 55.

When there are small changes to the actual data stored in a data tree, the representation for a new data tree may be changed so as to match an old data tree as closely as possible, according to one embodiment of the present disclosure. In order to minimize the size of a binary delta that may be produced, an old tree may be transposed into a new tree with minimal changes in the representation of the new tree.

Figure 6:
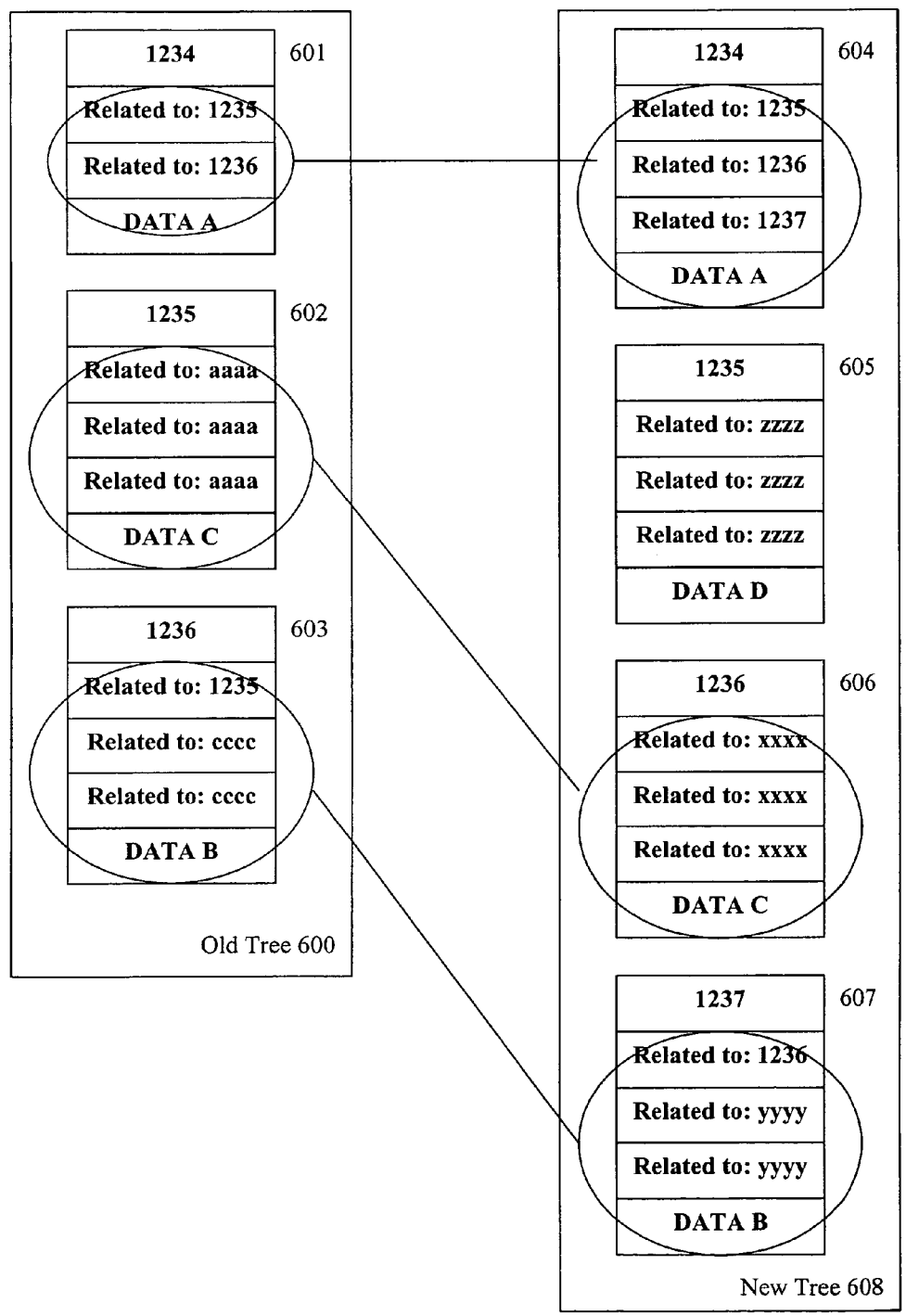
FIG. 6 is a block diagram illustrating a method for transposing data trees, according to an embodiment of the present disclosure.

FIG. 6 is a block diagram illustrating a method for transposing data trees, according to an embodiment of the present disclosure. After an old tree and a new tree are loaded from their respective virus signature files, they may be parsed and translated into an internal representation. The internal representation may be a representation that is not dependent on arbitrary labels previously assigned to the nodes of the trees. Nodes from each tree may be matched based upon their data and relationships (for example, by comparing the data that each node links to). For example, node 1234 601 of old tree 600 may be matched to node 1234 604 of new tree 608 because both nodes are linked to "Data A." Similarly, node 1235 602 of old tree 600 may be linked to node 1236 606 of new tree 608 and node 1236 603 of old tree 600 may be linked to node 1237 607 of new tree 608.

Figure 7:
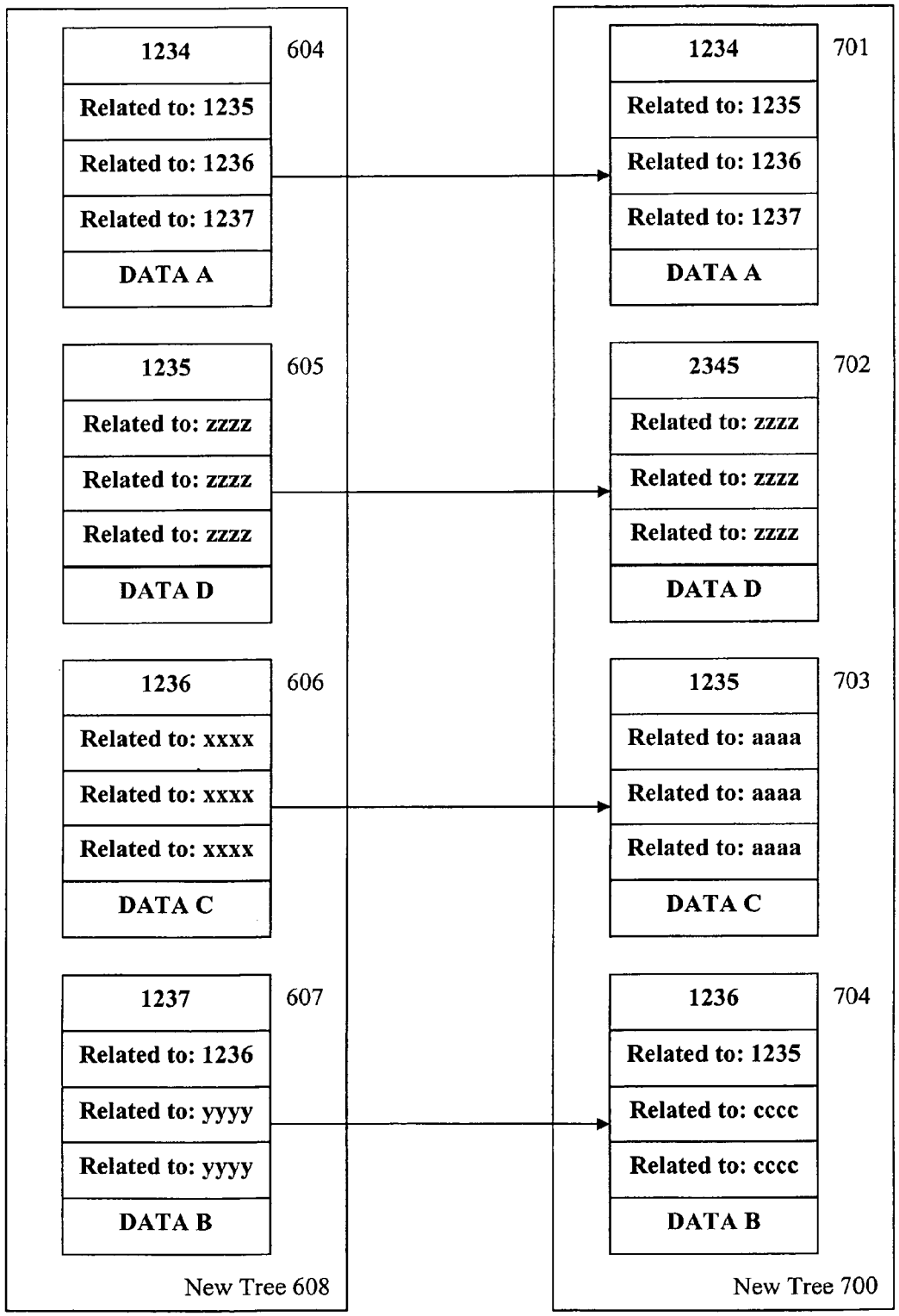
FIG. 7 is a block diagram illustrating the method for transposing data trees, according to an embodiment of the present disclosure.

FIG. 7 is a block diagram illustrating the method for transposing data trees, according to an embodiment of the present disclosure. After the nodes of the data trees are matched, they may be stored in a "transposition table." After matching is completed, the labels and references for each node of the new tree may be looked up in the transposition table and replaced with equivalent labels from the old tree, where such equivalence may exist. Nodes from the new tree for which no equivalent node label from the old tree may be available (for example, a new node) may be re-labeled with an otherwise unused unique label. For example, the label for node 1234 604 of new tree 608 remains the same whereas node 1235 605 of new tree 608 is relabeled as node 2345 702 in transposed tree 700.

Once the transposition labeling phase has been completed, the transposed data tree may be translated back to a native format for virus signature files in order to create the new transposed signature file 53. The transposed signature file 53 may be used as the target file for the binary delta algorithm 54, allowing the binary delta file 55 to be distributed to customers as the core of their signature updates.

Although the present invention has been described in multiple embodiments, a myriad of changes and modifications may be suggested to one skilled in the art, and it is intended that the present invention encompass such changes and modifications as fall within the present appended claims.

What is claimed is:

1. A method for transposing data trees, comprising:
translating a first data tree and a second data tree into a first format;
matching data in the first data tree to data in the second data tree;
replacing a label within the second data tree with a label within the first data tree if the data in the first data tree matches the data in the second data tree and such a label is provided in the first data tree;
storing the replaced label in a third data tree; and
translating the third data tree into a second format that is a native format for virus signature files, and
wherein the first data tree and the third data tree are used as input files for binary delta generation associated with a virus signature upgrade.

2. The method of claim 1, further comprising storing the label within the first data tree and the label within the second data tree in one or more directories, files, databases, or tables.

3. The method of claim 1, wherein the first format is independent of the label within the first data tree.

4. The method of claim 1, wherein the label within the second data tree is replaced with a unique, unused label if no label is provided within the first data tree.

5. A system for transposing data trees, comprising:
a memory operable to store relational data; and
a processor coupled to the memory and operable to:
translate a first data tree and a second data tree into a first format;
match data in the first data tree to data in the second data tree;
replace a label within the second data tree with a label within the first data tree if the data in the first data tree matches the data in the second data tree and such a label is provided in the first data tree;
store the replaced label in a third data tree; and
translate the third data tree into a second format that is a native format for virus signature files, and
wherein the first data tree and the third data tree are used as input files for binary delta generation associated with a virus signature upgrade.

6. The system of claim 5, wherein the memory stores the label within the first data tree and the label within the second data tree in one or more directories, files, databases, or tables.

7. The system of claim 5, wherein the first format is independent of the label within the first data tree.

8. The system of claim 5, wherein the label within the second data tree is replaced with a unique, unused label if no label is provided in the first data tree.

9. A computer readable medium embodying logic for transposing data trees, the logic operable when executed to:
translate a first data tree and a second data tree into a first format;
match data in the first data tree to data in the second data tree;
replace a label within the second data tree with a label within the first data tree if the data in the first data tree matches the data in the second data tree and such a label is provided in the first data tree;
store the replaced label in a third data tree; and
translate the third data tree into a second format that is a native format for virus signature files, and
wherein the first data tree and the third data tree are used as input files for binary delta generation associated with a virus signature upgrade.

10. The computer readable medium of claim 9, wherein the label within the first data tree and the label within the second data tree are stored in one or more directories, files, databases, or tables.

11. The computer readable medium of claim 9, wherein the first format is independent of the label within the first data tree.

12. The computer readable medium of claim 9, wherein the label within the second data tree is replaced with a unique, unused label if no label is provided within the first data tree.

13. A method for transposing data trees to update a virus signature file, comprising:
comparing a first data tree representing an old virus signature file to a second data tree representing a new virus signature file;
matching data in the first data tree representing the old virus signature file to data in the second data tree representing the new virus signature file;

creating a third data tree comprising a transposed virus signature file, the third data tree created with the matching data from first data tree representing the old virus signature file to data and the second data tree representing the new virus signature file, the third data tree further created by replacing a label within the second data tree with a label within the first data tree if the data in the first data tree matches the data in the second data tree and such a label is provided in the first data tree;

using a binary delta algorithm to compare the first data tree representing the old virus signature file with the third data tree comprising the transposed virus signature file to produce a binary delta file; and distributing the binary delta file as a virus signature update file, wherein the binary delta file created by comparing the first data tree and the third data tree is smaller than a binary delta file created by comparing the first data tree and the second data tree.

14. The method of claim 13, wherein the first data tree comprises a relational binary tree having a plurality of nodes, each of the plurality of nodes comprising:
data that is matched to the data in the second data tree; and
a label comprising a unique identifier.

15. The method of claim 14, wherein each label comprises a unique destination vector for relational link to one or more other nodes within the plurality of nodes.

16. The method of claim 14, wherein the second data tree representing the new virus signature file uses a node labeling scheme that is different from a node labeling scheme used in the first data tree representing the old virus signature file.

17. The method of claim 13, further comprising:
prior to matching data in the first data tree and the second data tree, translating the first data tree representing the old virus signature file from a first format into a second format;
prior to matching data in the first data tree and the second data tree, translating the second data tree representing the new virus signature file from the first format into the second format; and
prior to using the binary delta algorithm to compare the first data tree and the third data tree, translating the third data tree representing the new virus signature file from the second format into the first format.

18. The method of claim 17, wherein:
the first format comprises a native format for a virus signature file; and
second format comprises an internal representation of a virus signature file that has been parsed and is not dependent upon one or more labels assigned to the data in the first format.

19. The method of claim 17, wherein:
the first data tree represents an old virus signature file;
the second data tree represents a new virus signature file; and
the third data tree represents a transposed new virus signature file.

20. The method of claim 1, wherein:
translating the first data tree and the second data tree into the first format comprises:
translating the first data tree from a native virus signature format to an internal representation of the first data tree, the internal representation comprising parsed data of the first data tree that is not label-dependent;
translating the second data tree from the native virus signature format to an internal representation of the second data tree, the internal representation comprising parsed data of the second data tree that is not label dependent; and
translating the third data tree into the second format comprises translating the third data tree from an internal representation of the data of the third data tree to a native virus signature format.

21. The method of claim 1, wherein the first data tree comprises a relational binary tree having a plurality of nodes, each of the plurality of nodes comprising:
data that is matched to the data in the second data tree; and
a label comprising a unique identifier.

22. The method of claim 21, wherein each label comprises a unique destination vector for relational link to one or more other nodes within the plurality of nodes.

23. The method of claim 21, wherein the second data tree uses a node labeling scheme that is different from a node labeling scheme used in the first data tree representing the old virus signature file.

* * * * *